United States Patent [19]

Bouteiller et al.

[11] Patent Number: 4,773,896
[45] Date of Patent: Sep. 27, 1988

[54] POWER DRIVING V BELT AND THE METHOD OF MANUFACTURING SAME

[75] Inventors: Christian Bouteiller, Montargis; André Cheymol, Dangé, both of France

[73] Assignee: Hutchinson, Paris, France

[21] Appl. No.: 35,380

[22] Filed: Apr. 6, 1987

[30] Foreign Application Priority Data

Apr. 11, 1986 [FR] France ............................. 86 05195

[51] Int. Cl.[4] .............................................. F16G 5/16
[52] U.S. Cl. ................... 474/242; 156/139; 474/201; 474/268; 474/270
[58] Field of Search ............... 474/268, 270, 271, 265, 474/242, 201, 237, 238, 250–252; 156/139, 140, 141, 172, 196; 228/170, 173.5, 178, 185, 189

[56] References Cited

U.S. PATENT DOCUMENTS

| | | | |
|---|---|---|---|
| 1,982,869 | 12/1934 | Heyer | 474/250 |
| 3,402,616 | 9/1968 | Prior | 474/251 |
| 4,595,385 | 6/1986 | Henderson | 474/201 |
| 4,648,857 | 3/1987 | David et al. | 474/201 |

FOREIGN PATENT DOCUMENTS

| | | |
|---|---|---|
| 2437531 | 4/1980 | France . |
| 2452035 | 10/1980 | France . |
| 1960350 | 6/1971 | Fed. Rep. of Germany . |
| 2505228 | 12/1976 | Fed. Rep. of Germany . |
| 655173 | 7/1951 | United Kingdom . |

OTHER PUBLICATIONS

Patent Abstracts of Japan, Vol. 8, No. 69 (M–286) [1506], Mar. 31, 1984; JP-A-58 217 845 (Honda Giken Kogyo K.K.) Dec. 17, 1983.

*Primary Examiner*—Thuy M. Bui
*Attorney, Agent, or Firm*—Bell, Seltzer, Park & Gibson

[57] ABSTRACT

An endless power transmission V belt is provided including a longitudinal reinforcement member formed by at least one member resistant to a tensile force such as a cable, made from a material chosen from metal, glass fibers or the like having a high tensile strength, transverse elements made from metal or another material having compression strength and an elastomer mass which integrally assembles the transverse elements together and with the longitudinal reinforcement member. The latter is blocked upright at least one transverse element by a nipping effect between said element or a part thereof and a piece cooperating therewith, such as a bar or the like, which is firmly secured thereto by appropriate means such as spot welding on the contact zones between said element and said piece, exclusively.

16 Claims, 5 Drawing Sheets

POWER DRIVING V BELT AND THE METHOD OF MANUFACTURING SAME

BACKGROUND OF THE INVENTION

1. Field of the Invention

The present invention relates to a new endless power driving belt having a trapezoidal section, more particularly intended for equipping speed variators with V groove pulleys, for transmitting the movement by contact and pressure in the groove of said pulleys and a method of manufacturing such a belt.

2. Description of the Prior Art

Belts are already known including a reinforcement member formed by one or more metal cables or the like which is equipped with transverse elements made from metal or from another material having good mechanical strength characteristics integrally joined together and with the carrier by means of an elastomer.

The patent FR-A-No. 2 437 531 (VARITRAC) discloses a metal reinforcement member which is formed by steel wires buried in a continuous longitudinal rubber strip, which is disposed in lateral slits formed in the transverse elements, these latter having a trapezoidal form whose small base constitutes the lower part of each transverse element. The connection by adhesion of the surfaces of the rubber strip, of the steel wires and of the transverse elements is obtained by forming them as an integral unit in which the rubber from which the strip is formed extends laterally between the transverse elements at least as far as the opposite side edges of these elements and at least over a part of the parallel side walls which border the recesses, in the gaps between the transverse elements to said side walls of which the rubber adheres.

In the construction disclosed in the VARITRAC patent, consequently, the metal reinforcement cables do not rest directly on the transverse elements, which as a general rule are also made from metal, the metal to metal contact of the reinforcement cables and of the edges of the slits of the transverse elements being avoided by interpositioning the rubber strip in which the reinforcement cables are buried.

Considering the fact that the rubber to metal interface is likely to be of a nature to cause destruction of the elastomer if a high tractive force is applied to the belt, by shearing under the effect of the pressure of the cables on the elastomer in the parts thereof the closest to the bottom of the groove of each of the pulleys, the patent FR-A-No. 2 452 035 (DAVID and TETARD) proposes forming a drive belt of trapezoidal section so that the metal reinforcement cables bear on the bottom of the recess formed in each of the transverse metal elements, these latter having a recess open towards their top part with a bottom substantially parallel to the upper and lower edges of the element and side edges substantially parallel to the oblique lateral sides of the element.

Such a structure of V belt transverse elements was already known from the patent GB-A-No. 655173 (PETER and PETER), although the transverse elements described in this patent are made from leather, synthetic material or vulcanized fibers and are mounted fixed or freely movable on an endless strip formed by a continuous strip, or by the juxtaposition of textile or metal cables in an endless layer or with the ends joined together.

The construction disclosed in the DAVID and TETARD patent has however proved to have considerable drawbacks: in a speed variator, a continuous speed variation over a considerable range of variation means that the belt is subjected to high lateral tensile and compression forces exerted by the flanges of the pulleys with which they cooperate and one at least of which, slideably mounted, is subjected to the action of a hydraulic control jack; the belt is thus subjected to high stresses which may lead to its breakage, which is promoted by the fact that the deformation resulting from the thrust exerted by the jack is aggravated by the arrangement of the reinforcement cable or cables in turns adjacent a single helical winding, which results in giving the transverse elements an orientation in the direction of the helix, which further increases the deformation of the belt, to which is added the metal against metal friction of the reinforcement cable on the bottom of the recess of each transverse element, which causes the premature wear of the cables. Furthermore, with the exception of the PETER and PETER patent, the prior documents are silent as to the means for retaining the cable or cables forming the reinforcement member after tensioning thereof and prior to the positioning of the elastomer. When such retention is obtained by crimping the ends of the cable or cables forming the reinforcement member, breakages of said member are frequently observed after an operating time very appreciably less than that which is expected of such belts in the speed variator mechanisms which they equip.

For such applications, in particular, but generally for a good power transmission which is an indispensible condition of the use of belts, it is important that their lateral sides have as good a surface contact as possible with the internal faces of the flanges of the pulleys on the one hand, and on the other hand, that the transverse elements keep their direction of orthogonality with respect to the meridian plane of the belt, that is to say that during operation there does not occur skewing of the belt with respect to the flanges of the pulleys. In so far as this latter condition is concerned, it should be recalled that the operation of the belt implies the existence of a possibility of relative movement of the transverse elements or plates with respect to the longitudinal reinforcement member, so that the problem raised is not that of giving the transverse elements good perpendicularlity with respect to the meridian plane of the belt during manufacture thereof, which may be provided without great difficulty, but of guaranteeing this positioning is kept during operation.

Another condition imposed on such belts, particularly those immersed in a liquid bath, such as oil at 120° C., is to reduce as much as possible the hydrodynamic resistance phenomena which result, because of stirring of said bath by the wings of the transverse elements or plates, the appearance of noises, on the one hand, and a reduction of the transmission efficiency, on the other.

The present invention provides then a trapezoidal or V power transmission belt which answers better the requirements of practice than the best of the solutions provided in the prior art, particularly in that it withstands the side thrust forces even applied with great force, in that it avoids premature wear of the reinforcement cables, in that it practically eliminates the risk of deformation of the belt, in that it maintains the structural integrity of its reinforcement member even after an extended operating time and in that it provides excellent drive not only in so far as the efficiency is concerned but also the absence of noise or other disturbing factors.

Another aim of the invention is to provide a method of manufacturing such an improved driving V belt.

SUMMARY OF THE INVENTION

The present invention provides then an endless power transmission belt of trapezoidal section which includes a longitudinal reinforcement member formed by a tension resistant member or a plurality of such members such as cables, made more especially from metal, glass fibers or any synthetic material having a high tensile strength, transverse elements made from metal or another material having good compression strength and a mass of elastomer which integrally assembles the transverse elements together and with the longitudinal reinforcement member, wherein said longitudinal member is blocked upright at least one transverse element by a nipping effect between said element, or a part of said element, and a piece cooperating therewith such as a bar or the like, and which is integrally secured thereto by any appropriate means in the contact zones of said element and of said piece, exclusively.

Such an arrangement which ensures immobilization by blocking, nipping or jamming the longitudinal reinforcement member with respect to the transverse elements for a force less than a given predetermined value, does not however prevent a relative movement of small amplitude of the transverse elements with respect to said member, during operation of the belt, such a relative movement providing an even distribution of the stresses in the absence of which there would be a risk of immediate breakage of the device.

In an embodiment in which the transverse elements are made from metal, for example from steel, the effect of nipping the ends of the longitudinal reinforcement member is provided by metal pieces substantially of the same thickness as that of the elements with which they cooperate and to which they are integrally secured by spot welding.

In a preferred embodiment, the spot welding is laser ray welding, the accuracy of this technique allowing welding of the immobilizing piece to the transverse element with which it cooperates without touching the longitudinal member which thus maintains all its mechanical properties.

According to another feature of the invention, the transverse elements and the pieces cooperating with them for retaining the longitudinal ends of the reinforcement member are formed correspondingly, particularly in their parts intended to be secured together.

In a preferred embodiment, in which the longitudinal reinforcement member is formed by a bundle of cables, parts of the transverse elements on which the cables are disposed are formed with a plurality of notches forming partial housings for said cables and the pieces cooperating with said transverse elements for locking the longitudinal member by nipping or jamming are then formed as flat bars which bear on the zones analogous to merlons of the transverse element with which the they cooperate.

In a variant, the piece for locking the longitudinal reinforcement member is a bar one face of which is flat and the other of which has grooves disposed in correspondance with the cables which it is intended to nip or jam.

In yet another variant, the locking piece is formed of a bar obtained by metal deformation and thus partially takes on the apparent contour of the layer of cables not only on its face in contact with said cables but also on the face opposite thereto.

The presence of the cable reception notches cut out in the transverse elements, on the one hand, and immobilization by blocking, nipping or jamming the ends of the longitudinal member on the other, allow an improved belt of the invention to be manufactured using modern elastomer injection molding methods which it is known can be conducted at very high pressures, of an order of size ten times greater than that of the pressures used in normal compression molding techniques.

In another embodiment, retention of the longitudinal ends of the reinforcement member is provided by means of pieces of smaller spread than those of the transverse elements, so that it is only on a part of the transverse element that engagement of said element and of said piece takes place.

According to another feature of the invention, the longitudinal reinforcement member of the belt rests in the notches formed in each of the transverse elements, with interpositioning of a thin elastomer layer between the member and said notches.

In one embodiment, it is said notch which is lined with a thin or very thin elastomer layer.

In another embodiment, the cable or cables which form the longitudinal member is or are coated with a thin elastomer layer whose thickness is of the same order of size as that of the above mentioned layer.

According to yet another feature of the invention and in the case of a longitudinal reinforcement member having one or more cables, this or these latter is or are disposed in a layer forming a single helix or a double helix, each turn of the cable or cables being housed in one of the notches of the plurality of juxtaposed notches formed in each transverse element.

In the case of a double helix, the two helixes are equally tensioned and of opposite pitches.

One arrangement of the invention, having turns of the cable or cables partially housed in the notches formed in each transverse element, the engagement between a given cable and each transverse element can be placed closer to the neutral fiber of the cable, the area over which the pressure is exerted can be increased by a factor X and consequently the value of the pressure exerted by each cable per unit area of each transverse element may be divided by a similar factor.

Furthermore, because the cables are housed in said notches, the cables are held strictly in position during molding of the elastomer integrally assembling or joining the transverse elements to the longitudinal reinforcement member.

Furthermore, such an arrangement which places the engagement between the cable and each transverse element as close as possible to the neutral fiber of the cable, reduces the harmful effects due to the shocks introduced by variation of the drive torque during use of the belt in a speed variator. In a particularly preferred embodiment of the invention, the transverse elements are plates whose lateral edges are joined together on their outer largest size by a substantially rectilinear edge—except for the notches providing partial housing of the cables of the carrier—and, on their opposite internal side of smaller size, by a rectilinear or curved edge whose concavity is turned towards the inside of the belt.

Such an arrangement, which suppresses the parts similar to wings or fins of the prior known elements, considerably reduces stirring of the liquid bath in which the belt is immersed, with consequently a reduction of the operating noise and an improvement in the transmission efficiency.

This latter is further increased when, in accordance with another feature of the invention, the hydrodynamic resistance is reduced at the same time as the belt is lightened, by the presence of recesses in the plates forming the transverse elements.

Furthermore, this suppression of the fin shaped parts of known prior constructions further increases, for a same belt length, the available length for positioning of the cables or similar of the longitudinal reinforcement member, so that a greater amount of connecting elastomer may be provided between each of the cables forming said member, which reduces correspondingly the fatigue of said cables or the like.

Complementarily, the larger spacing between cables in this construction facilitates interlocking of the tension piece and the preferred associated plate for locking the longitudinal reinforcement member while not requiring a too precise tooling for the welding.

According to the invention, the characteristics of the belt are further improved by using, for the elastomer material for integrally securing the transverse elements together and with the longitudinal reinforcement member, an elastomer material with a high Young's modulus.

The use of a material having such characteristics results in the formation in the belt of a return torque which tends to oppose the skewing of the plates with respect to the meridian plane of the belt as soon as a possible loss of orthogonality of the plates appears with respect to said plane with, consequently, maintenance of the required operating qualities.

Besides the advantage which has just been described, the use of an elastomer material with a high Young's modulus as material for joining the plates together and to the longitudinal reinforcement member allows, after manufacture of the belt, machine truing of the lateral sides of the belt, in the meaning given to this term in the technique of machining metals or metal alloys.

With such machining or adjustment as good a surface contact as possible can be provided between the internal faces of the flanges of the pulleys and the sides of the belt and possible irregularities of form of the sides may be suppressed likely to cause skewing of the belt with respect to the flanges.

Complementarily, the machining or truing operation which, during manufacture, removes the small debris of fragments not only of the elastomer but also of the steel forming the transverse elements or plates means that the belt may be used without running in and avoids any introduction of rubber or steel debris into the oil bath or similar in which it is immersed.

For obtaining an elastomer with high Young's modulus the invention provides in a first embodiment, charging said elastomer with fibers, for example natural or synthetic material fibers, such as polyester fibers or aramide fibers of the type known under the name of Kevlar (a registered trademark of DUPONT DE NEMOURS).

Good results have been obtained with a fiber amount between 5 and 30% by weight of the mixture. At least 30% of the fibers of the charge, whose distribution in the elastomer material is random, have however a direction which is substantially satisfactory for the desired aim, namely an increase of the transverse stiffness which however does not impair the longitudinal flexion characteristics.

In a preferred embodiment, the elastomer was a rubber of the epichlorohydrin type, for example that known under the name HYDRIN (registered trademark of The B. F. GOODRICH Cy) charged with textile or aramide fibers giving an elastomer with a high Young's modulus.

The invention also provides a method of manufacturing a V drive belt having a longitudinal reinforcement member formed by a filiform member or a plurality of such members such as cables, more particularly made of metal, glass fibers or any synthetic material having high tensile strength, transverse elements made from metal or a material having high compression strength as well as an elastomer mass which integrally assembles the transverse elements together and to the longitudinal reinforcement member, after said transverse elements have been positioned on a core with radial peripheral slits and after the reinforcement member has been disposed on said elements and tensioned, wherein, on at least one of said transverse elements, a piece is provided for blocking the ends of said longitudinal reinforcement member, said piece is forced onto said transverse element for blocking the ends of the reinforcement member by nipping or jamming, said piece and the transverse element with which it cooperates are integrally secured together and then the elastomer is molded.

In an advantageous embodiment, the stumps of the longitudinal member, that is to say the parts of said member which extend between the non fixed end to a transverse element and the blocking zone on said element are also jammed at their free ends against a transverse element adjacent the one already used for jamming said reinforcement member.

In one embodiment, the piece or pieces for nipping or jamming the longitudinal reinforcement member against the transverse element with which it cooperates is/are fixed by spot welding.

In a particularly advantageous embodiment, the spot welding is laser ray welding.

Molding of the elastomer takes place by compression, at a pressure of the order of 150–200 bars.

In another preferred embodiment, molding of the elastomer takes place by injection, at a pressure substantially greater than that used for the compression and which may be of the order of 1500 to 1800 bars.

BRIEF DESCRIPTION OF THE DRAWINGS

The invention will be better understood from the following description with reference to the accompanying drawings in which.

DESCRIPTION OF THE PREFERRED EMBODIMENTS

Figure 1:
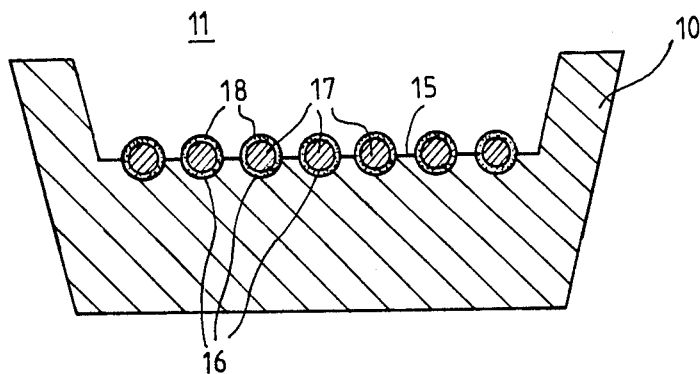
FIG. 1 is a cross sectional view of a belt in accordance with the invention for a first embodiment, the section being made in line with a transverse element, the elastomer for integrally assembling the transverse elements to the longitudinal reinforcement member being omitted for the sake of simplicity of the drawings.

In a first type of embodiment, the driving V belt of the present invention is formed of a plurality of transverse elements 10 of trapezoidal shape, preferably made from metal of great hardness, such as steel of grade 35 NC6 or 35 CD4 tempered and annealed for hardnesses of the order of 64 Hrc, from a rigid synthetic material or from any other material having good compression strength and at the upper part of which is formed a recess 11 whose bottom 15 receives a plurality of cables C preferably made from steel, but which may also be made from glass fibers or synthetic fibers for example from Kevlar (a registered trademark of DUPONT DE NEMOURS) having high wear resistance, the assembly of which forms the longitudinal reinforcement member A of the V belt. The transverse elements 10 are integrally assembled together and to the longitudinal reinforcement member by an elastomer mass 30 which partially fills the recesses 11 of the transverse elements and the spaces separating the consecutive transverse elements in the longitudinal direction of the belt (FIG. 3). The elastomer mass is adapted so that the rate of extension and the rate of compression, so of deformation, are the lowest possible and, in any case, sufficient so that the number of deformation cycles is greater than $10^8$. In the embodiments described and shown with reference to FIGS. 1 to 12, the elastomer mass has, between the transverse elements 10, an external surface 31 with outwardly turned concavity and an internal surface 32 having a smaller mean radius with inwardly turned concavity.

Figure 7:
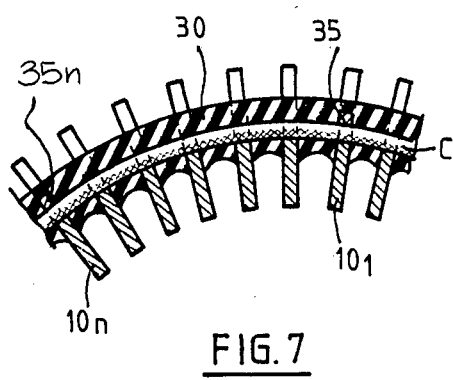
FIG. 7 is another schematical view illustrating the manufacturing method and the product obtained by use thereof.

According to a first feature of the invention, the longitudinal reinforcement member is blocked in line with at least one transverse element $10_1$, FIG. 7, by a nipping or jamming effect between said element or a part of said element and a piece 35, such as a bar or similar, cooperating with said element $10_1$ and which is integrally secured therewith in the contact zones between said element and said piece, exclusively.

The interlocking of piece 35 and the transverse element $10_1$ is provided so as to allow a relative movement of said transverse element with respect to the cable or cables during operation of the belt, while opposing such a relative movement for tensile forces acting on the cable or cables less than a predetermined value.

Piece 35, for locking or blocking the cable or cables forming the longitudinal member by nipping, is advantageously a metal bar of the same thickness as the transverse elements 10 and which is adapted for clamping the cable or cables between the bottom 15 of element $10_1$ and said bar.

Figure 9:
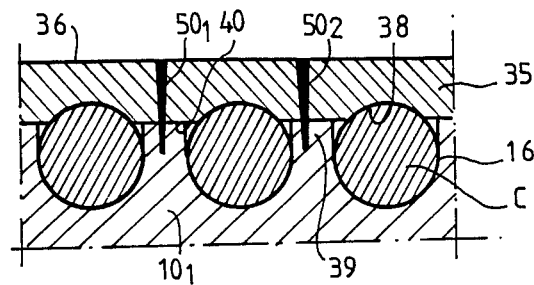
Figure 10:
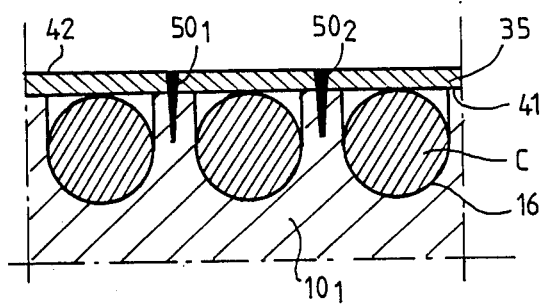
Figure 11:
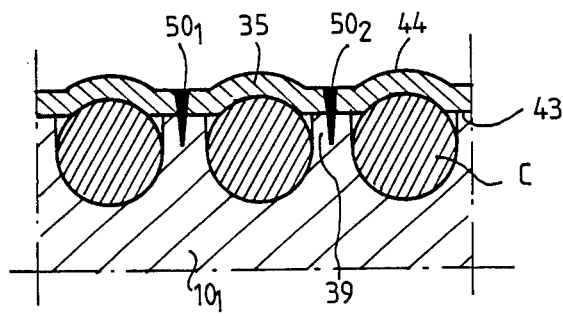
Figure 13:
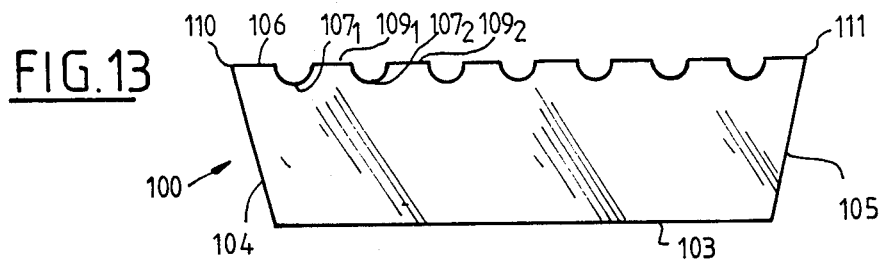
FIG. 13 is an elevational view of an improved belt plate of the invention for another embodiment.

In one embodiment, piece 35 for locking by nipping the ends of the cable or cables forming the longitudinal member is substantially of the same length (measured perpendicularly to the direction of the member) as that of the bottom 15 shown schematically in FIGS. 9 to 11 which are partial views.

Figure 12:
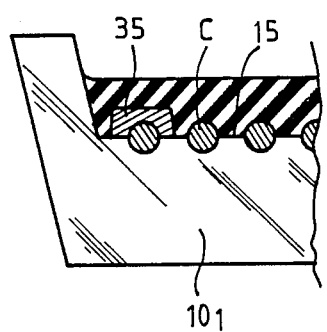
FIGS. 9 to 12 show schematically different embodiments of blocking pieces for forming the belts of the invention.

In another embodiment, FIG. 12, the locking piece 35 for nipping the ends of the cable forming the longitudinal member is a bar whose length is a fraction only of the length of bottom 15, just sufficient to overlap the cable and bear on piece $10_1$ on each side of the cable only.

According to another characteristic of the invention, the bottom of recess 11 of each element is cut so as to form a plurality of notches for forming partial housings for the cable or cables forming the longitudinal reinforcement member of the belt.

In the embodiments shown, each transverse element or plate 10 is cut so as to form juxtaposed notches 16 whose number is equal to the number of turns of the cable or cables forming the longitudinal member of the belt. With this arrangement, the axis of each turn of the cable can be brought closer to the engagement zone between each turn and the plate 10 for improving the progressivity, without jerks, of the variation of the movement in a range of variation of the order of 5 to 6 without the dimensions or the weight of the speed variator having a belt in accordance with the invention being disadvantageously effected.

In such a construction, a first embodiment provides for forming the bar 35 as shown in FIG. 9, that is to say with a flat external face 36 and an internal face having grooves 38 in contact with the cable C and rectilinear parts 40 in contact with zones 39, similar to merlons, which separate the notches 16 of the plate $10_1$.

In the embodiment shown in FIG. 10, the plates 10, have notches 16 of greater depth than that of the construction described with reference to FIG. 9 and the bar 35 is a straight bar with flat internal 41 and external 42 faces. The use of a flat bar allows simpler relative positioning than in the case of a groove bar.

A bar of this latter type is also shown in FIG. 11. In this construction, the bar 35 is obtained by metal deformation and it assumes the shape, not only on its internal face 43 but also on its external face 44, of the apparent contour of the bundle of cables C with, here also, contact zones of the internal face 43 with parts 39, similar to merlons, of element $10_1$.

Figure 8:
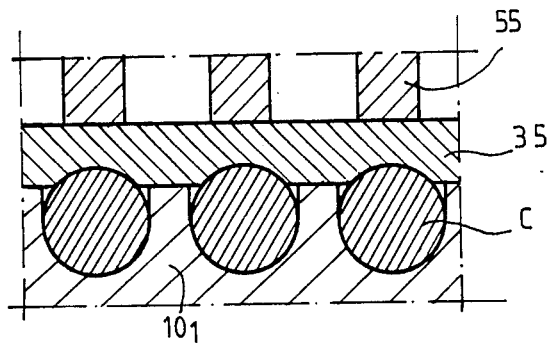
FIG. 8 further illustrates another phase of the manufacturing method.

Whatever the embodiment, in accordance with the invention, the bar 35 and plate $10_1$ are spot welded together, a comb 55 providing the required pressure during welding (FIG. 8).

In a preferred embodiment, the spot welding is laser ray welding carried out, as shown by references $50_1$, $50_2$, etc. ... in the zones of contact between the internal face of the bar and the transverse element $10_1$, with which it cooperates.

According to another feature of the invention, frictional wear of the cable or cables on the bottom 15 of recess 11 is avoided by interposing a thin elastomer layer between said cable or cables and said bottom of the recess cut out so as to form notches 16.

Figure 2:
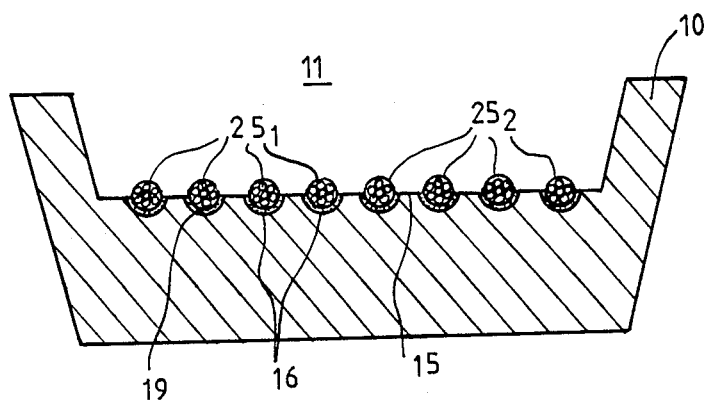
FIG. 2 is a view similar to that of FIG. 1, of another embodiment of the belt of the invention.
Figure 3:
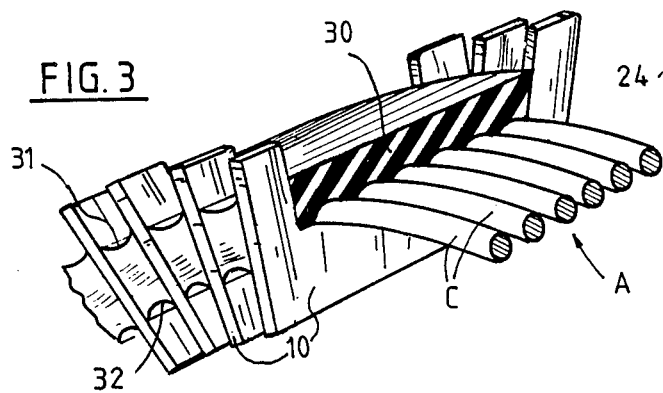
FIG. 3 is a schematical perspective view of one embodiment of the belt of the invention.

In one embodiment, the thin elastomer layer lines each of the notches 16 over a small or very small thickness, FIG. 2.

In another embodiment, the thin interposed elastomer layer is formed by a sheath which surrounds the cable or cables of the longitudinal reinforcement member of the belt in accordance with the present invention, FIG. 1.

Figure 6:
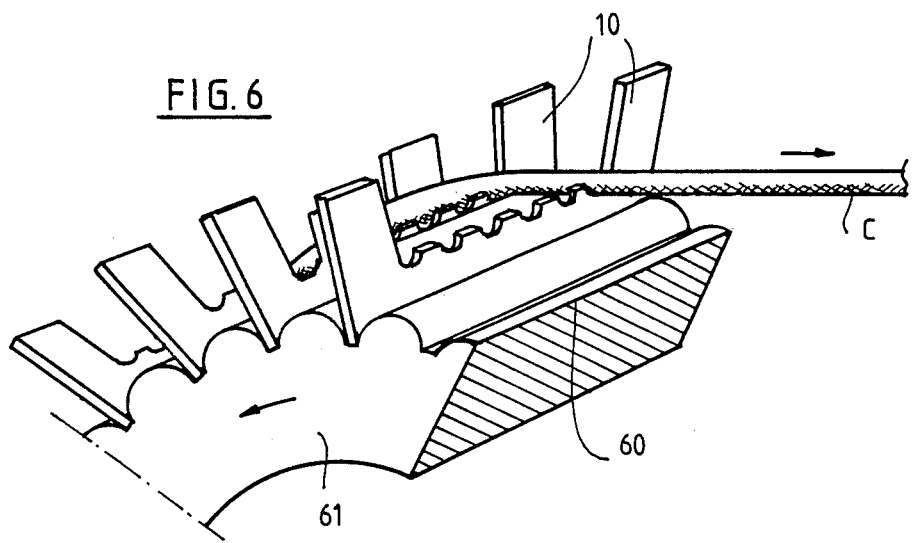
FIG. 6 is a schematical view illustrating another phase of the manufacturing method of the invention.

For manufacturing a belt of the invention, the plates 10 are first of all disposed in the peripheral radial slits 60 of a manufacturing core 61. FIG. 6, then the cable or cables C are placed in position by fixing one or their ends by means of a bar 35, as mentioned above; then a controlled tension is exerted on the cable or cables placed in a layer of close turns partially housed in the notches 16 formed in the bottom 15 of the recesses 11 of the plates. When the required tension is reached the cable or cables C are fixed similarly to what was described above by means of a bar 35, at their other end and the cable or cables are cut. The "stumps" of the cable or cables of the reinforcement member, that is to say the parts remaining free after cutting, are then advantageously bent back onto plates 10 and locked by means of a bar $35_n$ on a plate $10_n$ in the same way as described above for bar 35 and plate $10_1$ (FIG. 7).

The elastomer 30 is then added by a compression molding process, under a pressure of about 150 bars or, preferably, by an injection molding process, carried out at a substantially higher pressure, of the order of 1800 bars, but of a much shorter duration, of the order of a few minutes.

By an appropriate choice of the pressure applied by comb 55, during the spot welding operation, the ends of the cable or cables forming the longitudinal member are sufficiently locked to withstand the pressures used during molding. The fact that said turns are partially housed in notches 16 also contributes to holding the turns of the cable or cables of the reinforcement member in position.

Figure 4:
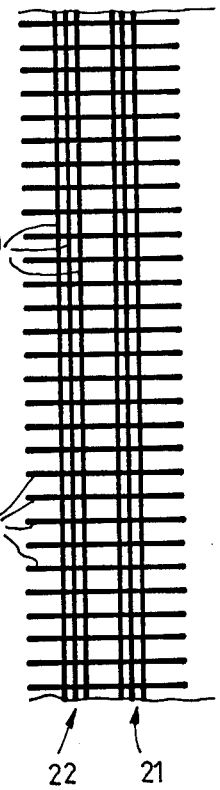
FIG. 4 is a partial schematical view in expanded longitudinal section of a belt of the invention.

In accordance with the invention, the cable or cables 20 which form the longitudinal reinforcement member of the V belt 24 are disposed, as shown very schematically in FIG. 4, in one or more equally tensioned helixes 21, 22 of opposite pitches, which prevent buckling of the transverse elements 23 which are integrally secured to said cable or cables 20, under the effect of the lateral thrusts to which the belt 24 is subjected during operation.

Figure 5:
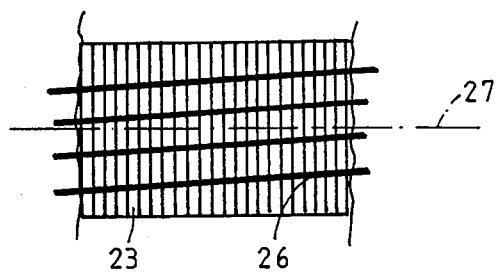
FIG. 5 is an explanatory diagram illustrating a phase of the method of manufacturing a belt of the invention.

In such a construction, the turns of the cables are in fact slanted with respect to the longitudinal direction of the belt, although this is not shown clearly in FIG. 4. For positioning of the cable or cables, similarly to what was described above, a stack of transverse elements or plates 23, FIG. 5, is prepared in which the bottom 15 of recesses 11 is machined so as to form grooves 26 slanted with respect to the longitudinal direction 27 of the expanded belt, so as to define the desired helical trace of the notches 16 when the transverse elements or plates 23 are positioned on the manufacturing core 61. The cable or cables may be in the form of turns with a single winding or turns with two windings of opposite pitches directed from the side edges of the belt towards the median plane thereof.

In the embodiment shown in FIG. 1, each of the notches 16 formed in the bottom 15 of the recess 11 of each plate 10 receives a turn of a cable 17 made from a material having high mechanical properties, such as steel for example, covered with an elastomer sheath 18 of small thickness, whereas in the embodiment with two cables $25_1$, $25_2$ shown in FIG. 2, it is the juxtaposed notches 16 which are lined with a thin elastomer layer 19, the turns of the cables housed in said notches 16 being those of commercial stranded cables made from brass plated steel or similar.

Although the jamming of the cable or cables of the reinforcement member on two transverse elements $10_1$ and $10_n$ has been described above, it is obvious that such nipping or jamming may take place on other elements but in discrete number.

In a second type of construction, shown in FIGS. 13 to 20, the transverse elements 100, assembled integrally together and to the longitudinal carrier A by an elastomer mass 101 with an inner surface 102 turned inwardly and with a small radius of curvature (FIG. 16), have a generally trapezoidal shape with side edges 104 and 105 directed obliquely with respect to the external edge 106 and the internal edge 103, the solid angles of intersection between edge 106 and the side edges 104 and 105 being designated by 110 and 111, respectively. Edge 106 is cut out to form notches $107_1$, $107_2$, etc. in number corresponding to that of turns $108_1$, $108_2$, etc of the cable or cables 115 forming the longitudinal carrier A and the rectilinear parts of edge 106 between two consecutive notches are designated by $109_1$, $109_2$, etc. . . .

Figure 14:
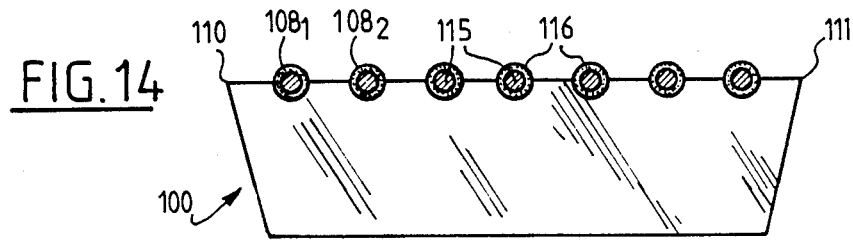
FIG. 14 shows the plate of FIG. 13 and the longitudinal member which is associated with the belt but without the integrating elastomer.
Figure 15:
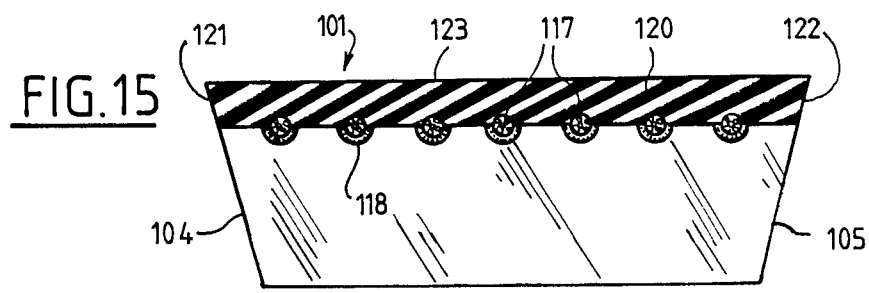
FIG. 15 is a view similar to that of FIG. 2 but with the elastomer shown and for another embodiment.
Figure 16:
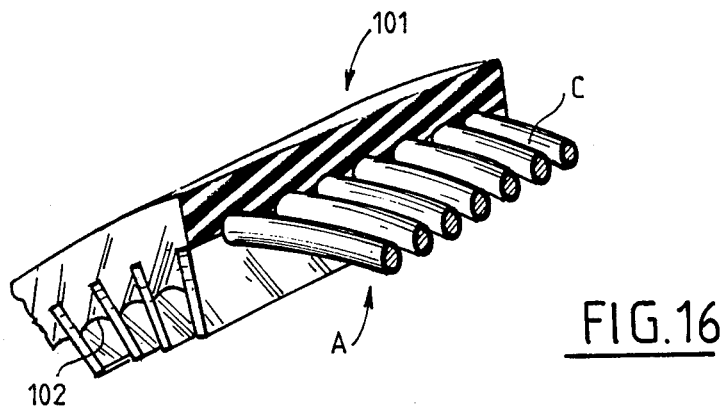
FIG. 16 is a schematical perspective view of a belt of the invention including plates such as shown in FIG. 13.

The cable or cables 115 forming the reinforcement member and which is (are) partially housed in the notches 107 is (are) coated with an elastomer sheath 116 of small thickness, as shown in FIG. 14, or in a variant the cable or cables 117 are housed in notches 107 after the bottoms thereof have been lined with a thin elastomer layer 118, see FIG. 15.

Whatever the construction, the cables C of member A are fixed at least at their ends, or in the vicinity thereof, by nipping between a plate or plate part 100 and a bar or similar secured to a plate by welding, advantageously by laser ray, to one or several parts such as 109 of edge 106; the fact that said parts are of greater length than in the previously described constructions allows less precise and so less costly welding equipment to be used while increasing the fatigue strength of cable C because of the greater elastomer thickness between adjacent turns.

The elastomer 101 used for integrally assembling the plates 100 together and said plates with the longitudinal member A is compression or injection molded so as to form a mass having a cap 120 with substantially trapezoidal cross section having lateral sides 121 and 122 substantially extending the edges 104 and 105 of the plates and an external edge 123 substantially parallel to the edge 106 of said plates, said gap being solid with the elastomer masses with internal surface 102 with inwardly turned concavity and which are shown between two adjacent transverse elements.

According to another feature of the invention, the elastomer material is an elastomer material with high Young's modulus, and, advantageously, such material in which the high value of said modulus is obtained by a charge incorporated in the elastomer, for example a charge of natural or synthetic material fibers such as aramide or polyester fibers present in a proportion between 5 and 30% by weight of the mixture.

The use of such an elastomer material further allows machine truing of the lateral edges of the belt after manufacture thereof.

The absence of projections in the region of the elastomer cap, when the belt is used in a device such as a speed variator, further reduces the operating noise and increases the transmission efficiency, because of the reduction of "stirring" of the oil bath in which the belt is immersed.

Figure 17:
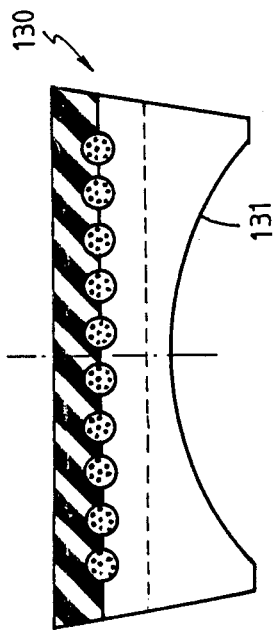
FIGS. 17 to 20 are views similar to that of FIG. 15 but for variants of construction.

This efficiency may be further increased when, as in the construction shown in FIG. 17, the plates or transverse elements 130 have an inner edge 131 which, contrary to that of the construction described immediately above, is curved with an inwardly turned concavity of the belt.

Figure 18:
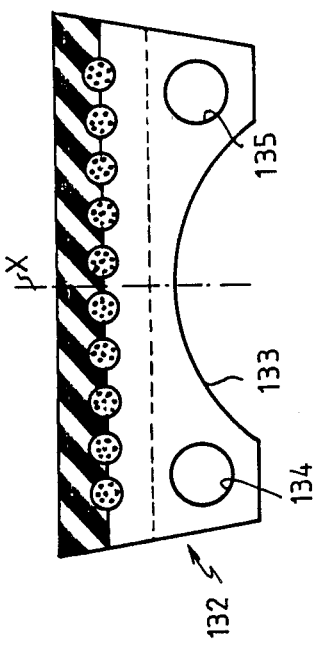
Figure 19:
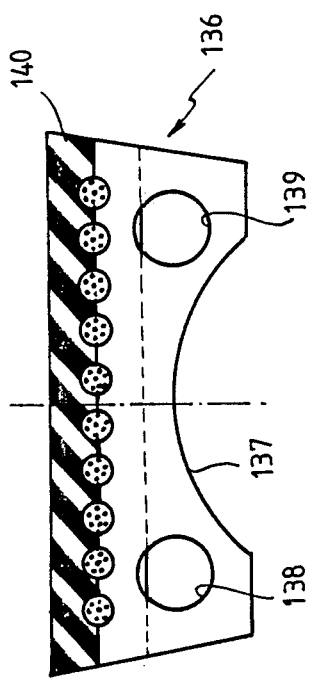
Figure 20:
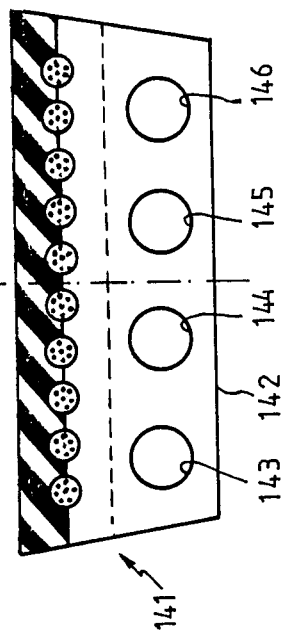

It is towards the same result that the constructions shown schematically in FIGS. 18 to 20 are directed. In the embodiment shown in FIG. 18, the plates or transverse elements 132 have a curved lower edge 133 as in the embodiment shown in FIG. 17; furthermore, and for further reducing the hydrodynamic drag on the one hand and reducing the weight of the belt on the other, said plates are pierced with orifices or holes such as 134 and 135 symmetrically disposed with respect to the axis X of the plate.

In the embodiment shown in FIG. 19, the transverse elements 136 also have a curved lower edge 137, with holes 138 and 139 of dimensions slightly greater than those of the holes 134 and 135 of the preceding embodiment and which are further placed with respect to the elastomer mass 140 so that said mass penetrates at least very slightly into said holes.

In the embodiment shown in FIG. 20, the plates or transverse elements 141 have a generally trapezoidal contour, with consequently an internal edge 142 of small dimensions similar to edge 103 of the embodiment shown in FIGS. 13 to 16, with however, in this embodiment, holes 143, 144, 145 and 146 formed by circular cuts in pairs symmetrical with respect to the axis X of a plate.

What is claimed is:

1. An endless power transmission V belt comprising a longitudinal reinforcement member which comprises at least one member resistant to tensile force, a plurality of high compression strength transverse elements arranged transversely with and connected to said longitudinal reinforcement member, an elastomer mass connected to said longitudinal reinforcement member and said transverse elements for forming an integral unit, and at least one piece cooperating in a nipping fashion with at least one of said transverse elements to lock said longitudinal reinforcement member to said at least one of said transverse elements.

2. The endless belt as claimed in claim 1, wherein said piece is a metal piece having substantially the same thickness as that of the transverse element, with which it cooperates and to which it is secured by spot welding.

3. The endless belt as claimed in claim 2, wherein the spot welding is laser ray welding.

4. The endless belt as claimed in claim 1, wherein said nipping piece has a transverse dimension that is a fraction of the transverse dimension of said transverse element with which it cooperates.

5. The endless belt as claimed in claim 1, wherein said transverse elements have a series of notches formed therein for receiving tensile resistant members and wherein said at least one piece cooperating with said at least one of said transverse elements for locking the longitudinal reinforcement member by nipping is shaped as a flat bar which bears on zones similar to merlons of the transverse element with which it cooperates.

6. The endless belt as claimed in claim 1, wherein said piece for locking the longitudinal reinforcement member is a bar one face of which is flat and the other of which has grooves disposed to correspond with the cables which it is intended to nip or jam.

7. The endless belt as claimed in claim 1, wherein said piece is formed of a bar obtained by metal deformation and thus assumes, partially, the apparent contour of the layer of cables not only on its face in contact with said cables but on the face opposite thereto.

8. The endless belt as claimed in claim 1, wherein said transverse elements are formed as plates having two side edges joined together along their largest external side by a substantially rectilinear edge in which are formed notches for receiving said tensile resistent members and said transverse elements having on their opposite internal side a smaller dimension by a curved edge with concavity turned inwardly of the belt.

9. The belt as claimed in claim 8, wherein the elastomer mass which integrally assembles the transverse elements together and with the longitudinal member includes a cap of substantially trapezoidal shape with side edges substantially extending to the edges of said transverse elements.

10. The belt as claimed in claim 1, wherein the elastomer mass has a high Young's modulus obtained by incorporating therein natural or synthetic fibers in a proportion between 5 and 30% by weight of the mixture.

11. The belt as claimed in claim 8, wherein said plates are provided with holes.

12. The belt as claimed in claim 1, wherein said at least one tensile resistant member is formed in a helix.

13. The endless belt as claimed in claim 1, wherein the longitudinal member of the belt rests on each of the transverse elements with interpositioning of a thin elastomer layer between the member and the element.

14. A method of manufacturing a power transmission trapezoidal or V belt including a longitudinal reinforcement member formed by at least a filiform member or a plurality of such members such as a cable, made from a material chosen from metal, glass fibers and synthetic material having high tensile strength, transverse elements made from a material chosen from metal and material having high compression strength, as well as an elastomer mass which integrally assembles the transverse elements together and with the longitudinal member after said transverse elements have been positioned on a core having radial peripheral slits and after a carrier has been disposed on the bottom of said recesses and tensioned, comprising the steps of engaging at least one of said transverse elements by a piece for blocking the ends of said longitudinal reinforcement member, forcing said piece onto said transverse element for locking the ends of the carrier by nipping or jamming, securing said piece and said transverse element with which it cooperates by spot welding and molding the elastomer.

15. The process as claimed in claim 14, wherein, after cutting the longitudinal member to the desired length, jamming the stumps thereof, the parts which extend between the free end not fixed to a transverse element and the blocking zone on said element, at their other free ends on a transverse element adjacent the one already used for jamming said member.

16. The process as claimed in claim 14, further comprising after manufacture, the step of machining the lateral sides of the belt by grinding or the like operation.

* * * * *